US012334696B2

(12) United States Patent
Tang et al.

(10) Patent No.: US 12,334,696 B2
(45) Date of Patent: Jun. 17, 2025

(54) TERMINAL

(71) Applicant: Tyco Electronics (Shanghai) Co. Ltd, Shanghai (CN)

(72) Inventors: Zebin (Donnie) Tang, Shanghai (CN); Liming (Eric) Wang, Shanghai (CN); Xinxin (Daisy) Li, Shanghai (CN); Yang (Leon) Zou, Shanghai (CN); Feng (Will) Chen, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 369 days.

(21) Appl. No.: 17/837,132

(22) Filed: Jun. 10, 2022

(65) Prior Publication Data

US 2022/0399654 A1 Dec. 15, 2022

(51) Int. Cl.

| | |
|---|---|
| ***H01R 4/16*** | (2006.01) |
| ***H01R 4/28*** | (2006.01) |
| ***H01R 11/11*** | (2006.01) |
| ***H01R 13/187*** | (2006.01) |
| ***H01R 13/639*** | (2006.01) |
| *H01R 13/04* | (2006.01) |

(52) U.S. Cl.

CPC ................. *H01R 4/16* (2013.01); *H01R 4/28* (2013.01); *H01R 11/11* (2013.01); *H01R 13/187* (2013.01); *H01R 13/639* (2013.01); *H01R 13/04* (2013.01)

(58) Field of Classification Search

CPC .. H01R 4/16; H01R 4/28; H01R 11/11; H01R 13/639; H01R 13/10; H01R 13/20; H01R 4/184; H01R 13/115; H01R 13/213; H01R 13/432; H01R 13/187; H01R 13/04; H01R 13/05

See application file for complete search history.

(56) References Cited

U.S. PATENT DOCUMENTS 3,546,664 A 12/1970 De Bolt et al.
4,550,963 A * 11/1985 Moors .................... H01R 13/20 439/177

(Continued)

FOREIGN PATENT DOCUMENTS

CN 203300856 U 11/2013
CN 106450874 A 2/2017

(Continued)

OTHER PUBLICATIONS

Machine Translation EP 1923960 A2, (May 21, 2008) (Year: 2024).*

Extended European Search Report dated Nov. 8, 2022, corresponding to Application No. 22178394.7-1201, 37 pages.

*Primary Examiner* — Travis S Chambers

(74) *Attorney, Agent, or Firm* — Barley Snyder

(57) ABSTRACT

A terminal comprises an insert sheet connecting part and a cable connecting part. The insert sheet connecting part defines a slot sized to receive an insert sheet. The slot is delimited by a bottom wall, a top wall and two side walls. The two side walls are formed by upwardly bent extensions of left and right sides of the bottom wall. The top wall defines two top wall portions formed by inwardly bent portions of the two side walls respectively. The top wall includes a protrusion extending toward the bottom wall, and a reinforcing rib extending from one side wall to the corresponding top wall portion formed by bending the one side wall.

20 Claims, 4 Drawing Sheets

(56) References Cited

U.S. PATENT DOCUMENTS

| | | | | | |
|---|---|---|---|---|---|
| 4,579,409 | A | * | 4/1986 | Enneper | H01R 13/20 439/948 |
| 4,632,483 | A | * | 12/1986 | Verin | H01R 13/20 439/845 |
| 5,639,270 | A | * | 6/1997 | Barbieri | H01R 13/20 439/852 |

FOREIGN PATENT DOCUMENTS

| | | | | | |
|---|---|---|---|---|---|
| CN | 211789804 | U | | 10/2020 | |
| EP | 1923960 | A2 | * | 5/2008 | H01R 13/113 |
| EP | 3576227 | A1 | * | 12/2019 | H01R 13/115 |

* cited by examiner

TERMINAL

CROSS-REFERENCE TO RELATED APPLICATIONS

This application claims the benefit of Chinese Patent Application No. 202110658800.2 filed on Jun. 11, 2021, the whole disclosure of which is incorporated herein by reference.

FIELD OF THE INVENTION

The present disclosure relates to the field of connectors, and more particularly, to an electrical terminal.

BACKGROUND

Existing F-type elastic sheet terminals typically include an insert sheet connecting part and a cable connecting part. The insert sheet connecting part defines a slot for receiving an insert sheet or mating terminal (e.g., a blade-type terminal). The slot is delimited by a bottom wall, a top wall, and two side walls. Opposing protrusions may be formed on the bottom wall and the top wall respectively. These protrusions are symmetrically designed and used to elastically press on the insert sheet when received within the slot.

These arrangements have several drawbacks. For example, inserting the sheet into the slot requires an increased insertion force in order to overcome the elastic force applied by the protrusions on the bottom wall and the top wall of the slot. Moreover, when the insert sheet is subjected to an external force, the protrusion on the bottom wall acts as a fulcrum, such that the entire terminal is easily deformed under a moment. This results in a poor contact between the insert sheet and the terminal, causing a poor connection or even a connection failure.

SUMMARY

According to an embodiment of the present disclosure, a terminal comprises an insert sheet connecting part and a cable connecting part. The insert sheet connecting part defines a slot sized to receive an insert sheet or mating connector. The slot is delimited by a bottom wall, a top wall and two side walls. The two side walls are formed by upwardly bent extensions of left and right sides of the bottom wall. The top wall is defined by two top wall portions formed by inwardly bent ends of the two side walls respectively. The top wall includes a protrusion extending toward the bottom wall, and a reinforcing rib extending from one side wall to the corresponding top wall portion formed by bending the one side wall.

BRIEF DESCRIPTION OF THE DRAWINGS

The invention will now be described by way of example with reference to the accompanying Figures, of which.

DETAILED DESCRIPTION OF THE EMBODIMENTS

Figure 1:
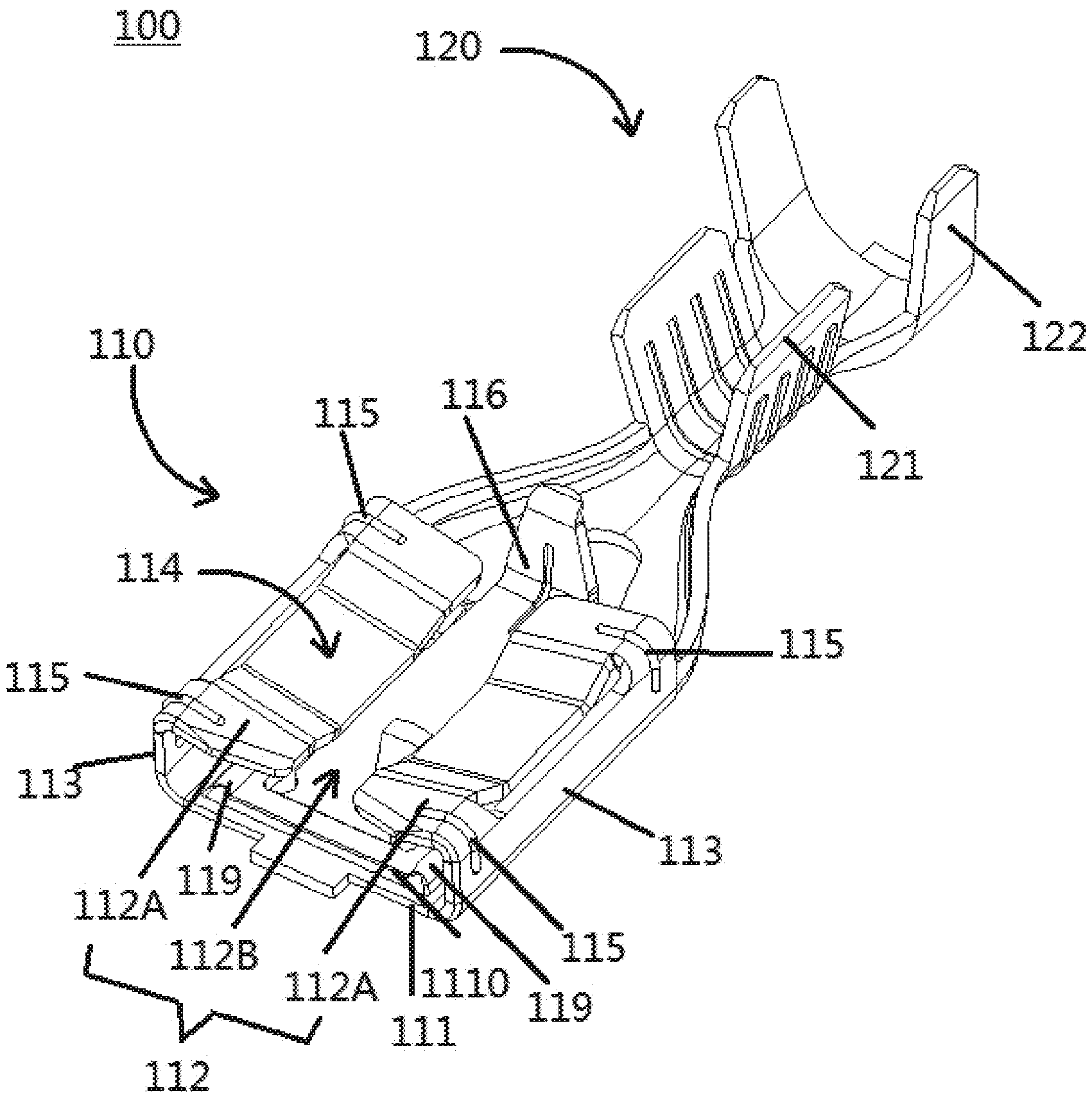
FIG. 1 is a perspective view of a terminal according to an exemplary embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure, a terminal is provided. The terminal includes an insert sheet (e.g., a blade-type mating connector) connecting part, and a cable connecting part. The insert sheet connecting part includes a slot for receiving an insert sheet or mating connector. The slot is delimited by a bottom wall, a top wall and two side walls. The two side walls are formed by bending upwards extensions of the left and right sides of the bottom wall. The top wall includes two top wall portions formed by bending inwardly the two side walls respectively. A gap is defined between the two top wall portions. The top wall is provided with a protrusion extending toward the bottom wall, and at least one reinforcing rib which extends from one side wall to the corresponding top wall portion formed by bending the one side wall.

Figure 2:
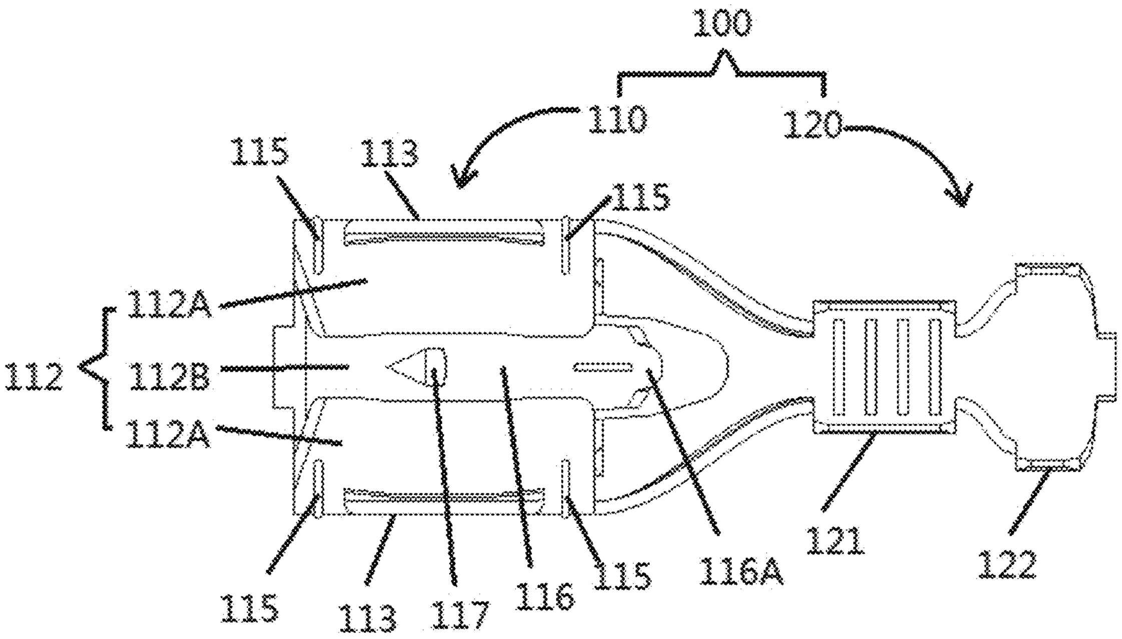
FIG. 2 is a top view of a terminal according to an exemplary embodiment of the present disclosure.
Figure 3:
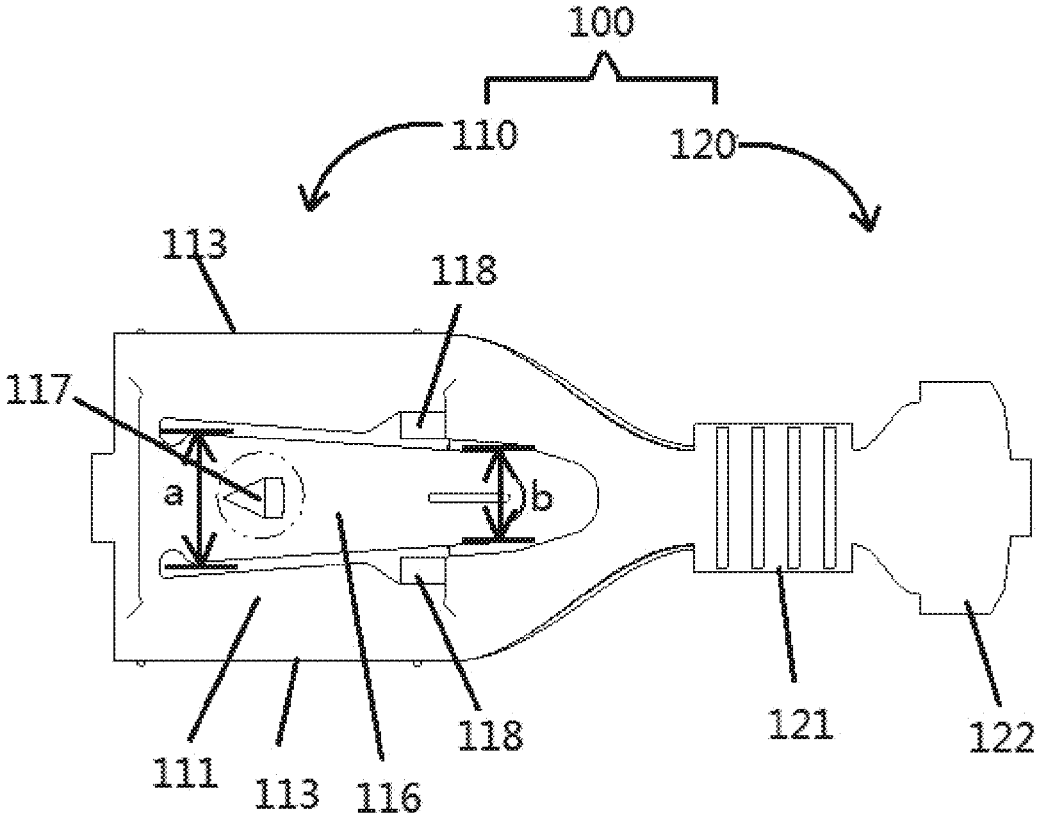
FIG. 3 is a bottom view of a terminal according to an exemplary embodiment of the present disclosure.
Figure 4:
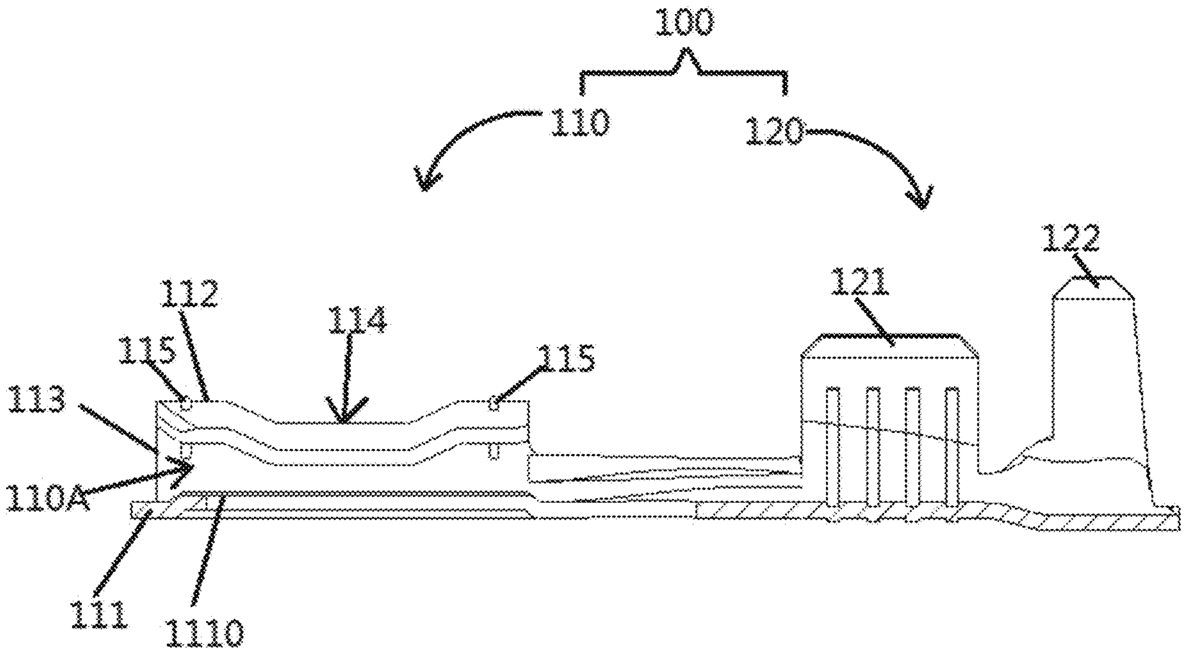
FIG. 4 is a side cross-sectional view of a terminal according to an exemplary embodiment of the present disclosure, in which a flat structure of the bottom wall is mainly shown.
Figure 5:
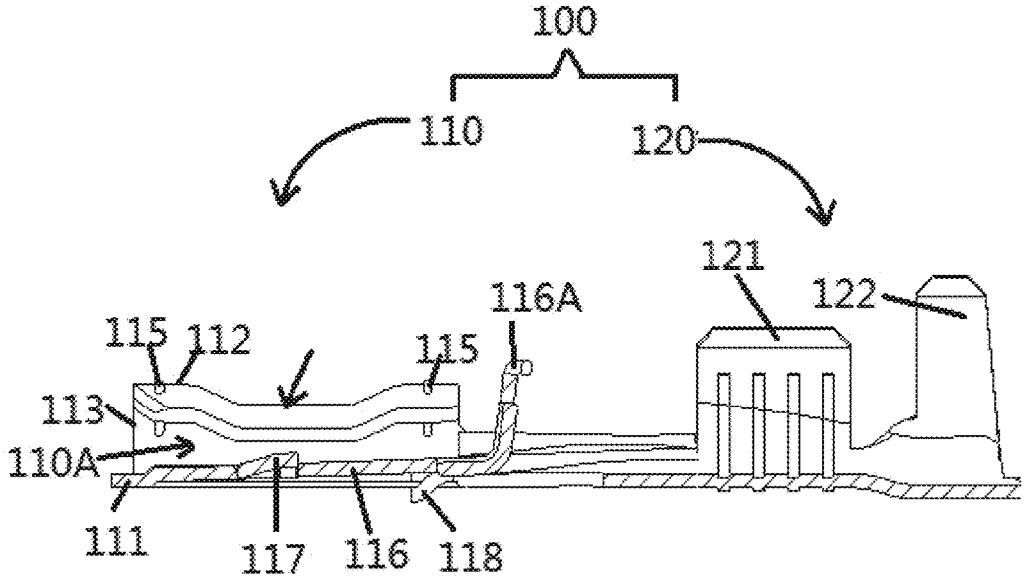
FIG. 5 is another side cross-sectional view of a terminal according to an exemplary embodiment of the present disclosure, in which an elastic arm extending from the bottom wall is shown.
Figure 6:
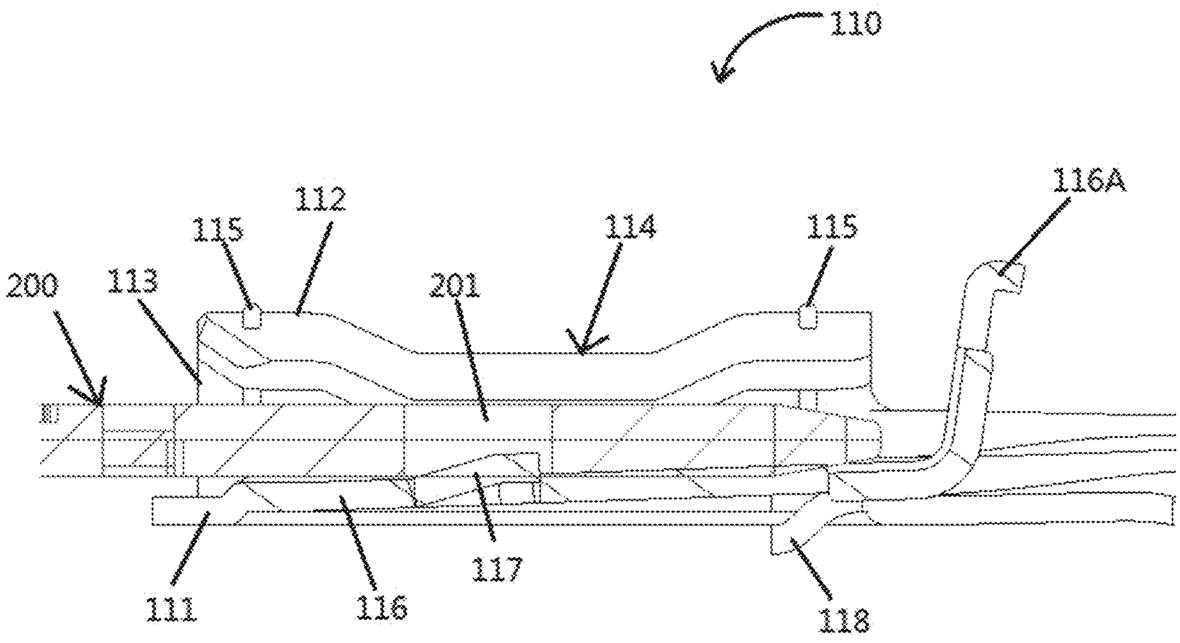
FIG. 6 is a side cross-sectional enlarged view of a terminal according to an exemplary embodiment of the present disclosure, in which the insert sheet is inserted in a slot of the insert sheet connecting part.

FIG. 1 is a perspective view of a terminal according to an exemplary embodiment of the present disclosure. FIG. 2 is a top view of a terminal according to an exemplary embodiment of the present disclosure. FIG. 3 is a bottom view of a terminal according to an exemplary embodiment of the present disclosure. FIG. 4 is a side cross-sectional view of a terminal according to an exemplary embodiment of the present disclosure, in which a flat structure of the bottom wall is mainly shown. FIG. 5 is another side cross-sectional view of a terminal according to an exemplary embodiment of the present disclosure, in which an elastic arm extending from the bottom wall is mainly shown. FIG. 6 is a side cross-sectional enlarged view of a terminal according to an exemplary embodiment of the present disclosure, in which the insert sheet is inserted in a slot of the insert sheet connecting part.

As shown in FIGS. 1-6, in the illustrated exemplary embodiment, a terminal 100 includes an insert sheet connecting part 110 and a cable connecting part 120. The insert sheet connecting part 110 is adapted to achieve a contacting connection with the insert sheet 200, and the cable connecting part 120 is configured to achieve a contacting connection with a cable (not shown). In an exemplary embodiment, the insert sheet connecting part 110 and the cable connecting part 120 are integrally formed, for example, by stamping and forming or shaping an entire metal sheet. Specifically, the insert sheet connecting part 110 includes a slot 110A for receiving the insert sheet 200 (as shown in FIG. 6). The slot 110A is delimited by a bottom wall 111, a top wall 112, and two side walls 113. The two side walls 113 are formed by bending upwardly from the left and right sides of the bottom wall 111, and the top wall 112 includes two top wall portions 112A formed by bending inwardly the two side walls 113, respectively. A gap 112B is located between two top wall portions 112A. The gap 112B is sized to reserve a resilience space for the two top portions 112A.

According to the present disclosure, as shown in FIGS. 1-6, the top wall 112 is provided with a protrusion 114 protruding toward the bottom wall 111, and at least one reinforcing rib 115. The reinforcing rib(s) 115 extend from one side wall 113 to a corresponding top wall portion 112A formed by bending the side wall 113. In this way, in the terminal 100 provided by embodiments of the present disclosure, the bottom wall 111 does not include a protrusion protruding toward the top wall 112. That is, the bottom wall 111 and the top wall 112 are not of a symmetrical structure or arrangement.

The reinforcing rib 115 extends from one side wall 113 to the corresponding top wall portion 112A formed by bending the side wall 113. More specifically, in the illustrated embodiment, four reinforcing ribs 115 are formed in a region of the top wall 112 located outside the protrusion 114. The reinforcing ribs 115 are dispersed in the side wall 113 and the four corners of the corresponding top wall portion 112A. That is, the reinforcing ribs 115 are disposed on the side wall 113 of the insert sheet connecting part 110 and the corresponding top wall portion 112A, thereby enhancing the intensity of the terminal.

The bottom wall 111 is substantially flat, and has a flat boss portion 1110 that protrudes toward the top wall 112. The flat boss portion 1110 extends longitudinally on the bottom wall 111. In contrast to prior art terminals, the terminal provided by the present disclosure has no the protrusion formed on the bottom wall, that is, the bottom wall and its flat boss portion 1110 define a flattened or flat structure, which not only effectively reduces the inserting force to the terminal applied by the insert sheet, but also avoids a fulcrum effect due to the protrusion on the bottom wall when the insert sheet inserted in the slot is subjected to an external force. As a result, the terminal is not easily deformed, and its reliability is increased.

According to the present disclosure, as shown in FIGS. 1 to 6, in the terminal 100 provided by the exemplary embodiment of the present disclosure, a rib 119 protruding toward the top wall 112 is provided on either side of the flat boss portion 1110. The rib 119 extends longitudinally on the bottom wall 111. The longitudinal direction described herein can be the connecting direction of the insert sheet connecting part and the cable connecting part or the insertion direction of the insert sheet. By setting the rib, the insertion force of the insert sheet can be reduced, which is benefit to the insertion of the insert sheet.

According to the present disclosure, the terminal 100 also includes an elastic arm 116 having a resilience. One end of the elastic arm 116 extends from the bottom wall 111 (specifically, one end of the elastic arm 116 can extend from the flat boss portion 1110 of the bottom wall 111), while the other end extends in a manner that is inclined toward the top wall 112. A pressing portion 116A is formed at the other end of the elastic arm 116. A locking portion 117 is formed on the elastic arm 116. The locking portion 117 serves to fit with a position hole 201 of the insert sheet 200 to lock the insert sheet 200 when the insert sheet 200 is inserted into the slot 110A. The locking portion 117 extends from the elastic arm 116 in a manner that is inclined toward the top wall 112.

With the above configuration, the locking portion 117 on the elastic arm 116 enters the positioning hole 201 (shown in FIG. 6) in the insert sheet 200 to lock the insert sheet 200 in the slot 110A, when the insert sheet 200 is inserted into the slot 110A. When the insert sheet 200 needs to be pulled out from the slot 110A, it is necessary to press the pressing portion 116A of the elastic arm 116 (in the structure shown in FIG. 6, the pressing portion 116A needs to be applied a downward pressure force) to disengage the locking portion 117 on the elastic arm 116 from the positioning hole 201 in the insert sheet 200, thereby achieving unlocking. After unlocking, the insert sheet 200 can be easily pulled out from the slot 110A. It can be seen that the terminal 100 provided by the present disclosure may achieve a rapid locking and unlocking to the insert sheet by providing the elastic arm and the locking portion. Further, according to an exemplary embodiment of the present disclosure, as shown in FIG. 3, the width a of the one end of the elastic arm 116 is greater than the width b of the other end of the elastic arm 116. More specifically, the width of the elastic arm 116 is gradually reduced from one end of the bottom wall 111 extending from the bottom wall 111 to the other end. With the aforementioned configuration of the elastic arm 116, a larger locking force can be achieved in a limited space.

According to the present disclosure, as shown in FIGS. 1 to 6, the terminal 100 includes a limit portion 118 which is formed by extending the bottom wall 111 in a direction away from the top wall 112. By setting the limit portion, the terminal 100 provided by the present disclosure is prevent from falling out from the plastic housing, when the terminal 100 is accommodated in the plastic housing.

According to the present disclosure, the protrusion 114 located in the top wall 112 has a substantially square structure. Specifically, the protrusion 114 located in the top wall 112 is formed by two side wall portions 112A together. Further, the protrusion 114 is inclined to the bottom wall 111 and the flat boss portion 1110 formed on the bottom wall 111, as the bottom wall 111 and the flat boss portion 1110 formed on the bottom wall 111 have substantially flat structures. For example, as shown in FIG. 4, the area of the flat boss portion 1110 is larger than the area of the protrusion 114. The flat boss portion 1110 and the protrusion 114 adopt an asymmetric structure.

According to the present disclosure, the cable connecting part 120 further includes a core riveting roll 121 and a sheath riveting roll 122. The core riveting roll 121 is closer to the insert sheet connecting part 110 than the sheath riveting roll 122. Specifically, the core riveting roll 121 is used to wind the bare core of the cable (not shown), and the sheath riveting roll 122 is used to wind the sheath of the cable (not shown). More specifically, the inner side surface of the core riveting roll 121 is provided with a raised cross pressing line for pressing against the bare core.

According to the present disclosure, as shown in FIGS. 1 to 6, in the terminal 100 provided by the exemplary embodiment of the present disclosure, the centerline of the slot 110A, the centerline of the core riveting roll 121 and the centerline of the sheath riveting roll 122 is arranged in the same straight line. In this way, the terminal 100 provided by the exemplary embodiment of the present disclosure preferably has a linear configuration.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A terminal, comprising:
- an insert sheet connecting part defining a slot sized to receive an insert sheet, the slot delimited by a bottom wall, a top wall and two side walls, the bottom wall is flat and includes a flat boss portion protruding toward the top wall and extending longitudinally along the bottom wall, the two side walls formed by upwardly bent extensions of left and right sides of the bottom wall, the top wall defining two top wall portions formed by inwardly bent portions of the two side walls respectively, the top wall including:
  - a protrusion extending toward the bottom wall; and
  - a reinforcing rib extending from one side wall to the corresponding top wall portion formed by bending the one side wall;
- a rib protruding toward the top wall and above the flat boss portion on either side of the flat boss portion, the rib extends longitudinally along the bottom wall; and
- a cable connecting part extending from the insert sheet connecting part.

2. The terminal according to claim 1, wherein a gap is defined between the two top wall portions in a width direction of the terminal.

3. The terminal according to claim 1, wherein the reinforcing rib is formed in a region of the top wall located outside the protrusion.

4. The terminal according to claim 1, wherein the protrusion has a square shape, and is inclined relative to the bottom wall and the flat boss portion.

5. The terminal according to claim 1, wherein an area of the flat boss portion is larger than an area of the protrusion, and the flat boss portion and the protrusion define an asymmetric structure.

6. The terminal according to claim 1, further comprising a limit portion defined by an extension of the bottom wall formed in a direction away from the top wall.

7. The terminal according to claim 1, further comprising an elastic arm having a first end extending from the bottom wall, and a second end extending in a manner that is inclined toward the top wall and including a pressing portion.

8. The terminal according to claim 7, wherein a locking portion is formed on the elastic arm and is sized to engage with a position hole of the insert sheet to lock the insert sheet within the slot.

9. The terminal according to claim 8, wherein the locking portion extends from the elastic arm in a manner that is inclined toward the top wall.

10. The terminal according to claim 9, wherein a width of the first end of the elastic arm is greater than a width of the second end of the elastic arm.

11. The terminal according to claim 1, wherein the cable connecting part further comprises a core riveting roll and a sheath riveting roll, the core riveting roll being closer to the insert sheet connecting part than the sheath riveting roll.

12. The terminal according to claim 11, wherein a centerline of the slot, a centerline of the core riveting roll and a centerline of the sheath riveting roll are arranged along a common straight line.

13. A terminal, comprising:
- a cable connecting part; and
- a receiving part defining a slot sized to receive a mating connector, the slot defined by:
  - a bottom wall;
  - a top wall having an intermediate section extending downwardly toward the bottom wall and two end sections arranged further from the bottom wall than the intermediate section in a vertical direction, the bottom wall including a flat boss portion protruding toward the top wall and extending longitudinally along the bottom wall;
  - a rib protruding toward the top wall from the bottom wall on each side of the flat boss portion, each rib extending longitudinally along the bottom wall and protruding toward the top wall to a height greater than the flat boss portion; and
  - two side walls defined by upwardly extending portions the bottom wall, the top wall defined by inwardly extending portions of the two side walls.

14. The terminal according to claim 13, wherein a gap is defined between the two top wall portions in a width direction of the terminal.

15. The terminal of claim 14, wherein the top wall further includes a reinforcing rib extending in the width direction from one side wall to a corresponding portion of the top wall.

16. The terminal according to claim 15, wherein the reinforcing rib is formed in a region of the top wall located outside the protrusion.

17. A terminal, comprising:
- a cable connecting part;
- a receiving part defining a slot sized to receive a mating connector, the slot defined by:
  - a bottom wall;
  - a top wall; and
  - two side walls defined by upwardly extending portions the bottom wall, the top wall defined by inwardly extending portions of the two side walls, the top wall defining two top wall portions formed by inwardly bent portions of the two side walls respectively, each top wall portion including:

a protrusion extending downwardly toward the bottom wall; and two end sections formed integrally with the protrusion and arranged further from the bottom wall than the protrusion intermediate section in a vertical direction, each end section arranged on opposite sides of the protrusion in a longitudinal direction of the terminal; and a rib protruding toward the top wall and above a flat boss portion of the bottom wall on at least one side the flat boss portion, the rib extends longitudinally along the bottom wall.

18. The terminal of claim 17, wherein at least one of the two end section of each top wall portion defines a reinforcing rib extending from a respective one of the two side walls to the corresponding end section.

19. The terminal of claim 17, wherein each end section of each top wall portion defines a reinforcing rib extending from one side wall to the corresponding end section.

20. The terminal of claim 17, wherein each protrusion includes a flat segment and a pair of inclined segments, each inclined segment arranged on an opposite end of the flat segment and inclining oppositely relative to the bottom wall in the longitudinal direction of the terminal.

* * * * *